US011111162B2

(12) United States Patent
Fenderson et al.

(10) Patent No.: US 11,111,162 B2
(45) Date of Patent: Sep. 7, 2021

(54) METHOD AND TREATMENT SYSTEM FOR TREATING MINERAL OR OIL SANDS TAILINGS

(71) Applicant: KEMIRA OYJ, Helsinki (FI)

(72) Inventors: Thomas Fenderson, Decatur, GA (US); Miguel Pelaez, Decatur, GA (US); Igal Maasen, Ackworth, GA (US); Yuping Luo, Johns Creek, GA (US)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 16/988,760

(22) Filed: Aug. 10, 2020

(65) Prior Publication Data

US 2021/0024385 A1 Jan. 28, 2021

Related U.S. Application Data

(62) Division of application No. 15/995,180, filed on Jun. 1, 2018, now Pat. No. 10,773,977.

(51) Int. Cl.
| | |
|---|---|
| *C02F 1/56* | (2006.01) |
| *C02F 1/52* | (2006.01) |
| *C02F 1/38* | (2006.01) |
| *C02F 1/00* | (2006.01) |
| *C02F 103/10* | (2006.01) |

(52) U.S. Cl.
CPC ............... *C02F 1/56* (2013.01); *C02F 1/001* (2013.01); *C02F 1/385* (2013.01); *C02F 1/5272* (2013.01); *C02F 2001/007* (2013.01); *C02F 2103/10* (2013.01)

(58) Field of Classification Search
CPC .. C02F 1/001; C02F 1/385; C02F 1/56; C02F 1/5272; C02F 2001/007; C02F 2103/10
See application file for complete search history.

(56) References Cited

U.S. PATENT DOCUMENTS

| | | | |
|---|---|---|---|
| 2016/0214874 A1* | 7/2016 | Domb | C02F 1/5236 |
| 2016/0272525 A1* | 9/2016 | Moffett | C10G 1/045 |
| 2016/0311709 A1* | 10/2016 | Yuan | C02F 1/56 |
| 2016/0312109 A1* | 10/2016 | Li | A43B 17/08 |
| 2017/0210641 A1* | 7/2017 | Ullah | B01J 20/06 |
| 2021/0002827 A1* | 1/2021 | Luo | D21H 21/10 |

* cited by examiner

*Primary Examiner* — James C Goloboy
(74) *Attorney, Agent, or Firm* — Robin L. Teskin; Baker, Donelson, Bearman, Caldwell & Berkowitz PC

(57) ABSTRACT

A method for treating tailings substrate from mining or oil sands separation process, the tailings substrate comprising an aqueous phase with suspended solid particulate material. In the method, a flocculating agent is added to the tailings substrate, flocs are allowed to form and the formed flocs are separated from the aqueous phase. The flocculating agent comprises a degraded polyacrylamide comprising at least anionic units and having a process water viscosity reduced by 25-99%, preferably 50-99%, compared to a substantially similar polyacrylamide that has not been degraded by a degradation agent, measured at a shear rate 1 s$^{-1}$ as a 0.4-0.8 weight-% solution of polymer in process water.

25 Claims, 3 Drawing Sheets

METHOD AND TREATMENT SYSTEM FOR TREATING MINERAL OR OIL SANDS TAILINGS

CROSS-REFERENCE TO RELATED APPLICATIONS

This application is a divisional of U.S. patent application Ser. No. 15/995,180, filed Jun. 1, 2018, the disclosures of all of which are herein incorporated by reference in their entireties.

FIELD OF THE INVENTION

The present invention relates to a method and use of a treatment system for treating mineral or oil sands tailings according to the claims presented below.

BACKGROUND OF THE INVENTION

Many industrial processes that involve production or treating mineral ores in order to extract mineral values will result in waste material. For example, mineral ores are ground and slurred in water to allow separation and recovery of desired components. The waste material may comprise an aqueous slurry of the residual components, which may comprise particulate mineral material such as clays, sand, grit, metal oxides, etc. These waste materials, often referred to as "tailings" are then typically subjected to dewatering processes. For example, the tailings may be deposited in pits or ponds, sometimes called tailings ponds, where solids are expected to settle and allow recovery of the supernatant water, and ultimate consolidation of the remaining mineral solids. Coal, copper, and gold mining are but a few of the mining processes that employ this technology.

Bituminous sands, also referred to as oil sands, are a type of petroleum deposit. Oil sands typically contain naturally occurring mixtures of sand, clay, water, and a dense, extremely viscous form of petroleum technically referred to as bitumen, or colloquially "tar" due to their similar appearance, odor, and color. Oil sands may be found in large quantities in many countries throughout the world, most abundantly in Canada and Venezuela. Oil sands reserves are an important part of the world's oil reserves, particularly as higher oil prices and new technology enable oil sands reserves to be profitably extracted and upgraded to usable products. Oil sands are often referred to as unconventional oil or crude bitumen, in order to distinguish the bitumen extracted from oil sands from the free-flowing hydrocarbon mixtures known as crude oil traditionally produced from oil wells.

Conventional crude oil may be extracted from the ground by drilling oil wells into a petroleum reservoir and allowing oil to flow into them under natural reservoir pressure, although artificial lift and techniques such as water flooding and gas injection may be required to maintain production as reservoir pressure drops toward the end of a field's life. Since extra-heavy oil and bitumen flow very slowly, if at all, towards producing wells under normal reservoir conditions, the sands may be extracted by strip mining or the oil made to flow into wells by in situ techniques that reduce the viscosity, such as by injecting steam, solvents, and/or hot air into the sands. These processes may use more water and may require larger amounts of energy than conventional oil extraction, although many conventional oil fields also typically require large amounts of water and energy to achieve good rates of production.

Water-based oil sand extraction processes generally include ore preparation, extraction and tailings treatment stages, wherein a large volume of solids-laden aqueous tailings may generally be produced.

These tailings may generally be referred to as oil sands process tailings, or oil sands tailings. These tailings may require solid-liquid separation in order to efficiently recycle the water and reduce the volume of the tailings. In many processes, these oil sands tailings are pumped to large settling ponds or tailings ponds.

In tailings ponds, the process water, unrecovered hydrocarbons and minerals generally settle naturally to form different strata. The upper stratum is usually primarily water that may be recycled as process water to the extraction process. The lower stratum generally contains the heaviest materials, mostly sand, which settle to the bottom of the pond. The middle stratum, often referred to as "mature fine tailings" ("MFT"), generally includes water and hydrophilic and biwetted ultrafine solids, mainly clays and other charged silicates and metal oxides, that tend to form stable colloids in water and exhibit a very slow settling and dewatering behavior, resulting in tailing ponds that may take several years to manage.

The composition of mature fine tailings tends to be highly variable. Near the top of the stratum the mineral content may be about 10% by weight and over time may consolidate and comprise up to 50% by weight of the materials contained at the bottom of the stratum. Overall, mature fine tailings may have an average mineral content of about 30% by weight. While fines may generally be the dominant particle size fraction in the mineral content, the sand content may be 15% by weight of the solids and the clay content may be up to 100% by weight of the solids, reflecting the oil sand ore and extraction process. Additional variation may result from the residual hydrocarbon which may be dispersed in the mineral or may segregate into mat layers of hydrocarbon. The mature fine tailings in a pond may not only contain a wide variation of compositions distributed from top to bottom of the pond, but also may contain pockets of different compositions at random locations throughout the pond. Additionally, mature fine tailings generally behave as a fluid-like colloidal material.

The slow settling of fine (<45 μm) and ultrafine clays as well as the large demand of water during oil sand extraction process have promoted research and development of new technologies to modify the water release and to improve settling characteristics of tailings streams. In treatment processes for dewatering oil sands tailings, clays and ultra-fine solids (<2 μm) are often challenging to capture and in many instances, may remain suspended in the treated water which will be recycled back to the extraction process. These solids may be detrimental to bitumen recovery, and as such, maximizing separation of the fines from the water during tailings treatment is of general importance. As such, improving the treatment of tailings is of great interest.

In some instances, treatment of mineral or oil sands tailings streams may generally comprise the use of flocculants. Flocculants, or flocculating agents, are chemicals that promote flocculation by causing colloids and other suspended particles in liquids to aggregate, thereby forming a floc. For example, flocculants are used in water treatment processes to improve the sedimentation or filterability of small particles. Flocculants that have been used in treatments for dewatering mineral tailings and oil sands tailings include polyacrylamide polymer flocculants. Due to the volume of polyacrylamide consumed for mineral or oil sands tailings, dry polyacrylamide (DPAM) is commonly used instead of solution or emulsion polymers. DPAMs typically have standard viscosities (SV) in the range of 3.5-6.5 cP. In mineral or oil sands tailings applications, it has been found that lower molecular weight (MW) products may have the potential to produce flocs with better dewaterability. While higher molecular weight products can provide flocculation, they can be more difficult to mix into the tailings and have a greater tendency to hold water. However, it has been observed that manufacturing low molecular weight DPAMs presents operational challenges because the polymerized gel may be very soft and tacky, which complicates the grinding and drying steps after polymerization.

Optimizing a polymer flocculant commonly involves adjusting the formulation at the point of production to create a polymer flocculant with desired properties, e.g., charge density, molecular weight, conformation, etc. While in theory this optimization can be used to formulate most effective polymer flocculants, in practice polymer production processes may have certain operational constrictions, such as the inability to grind and dry products with low molecular weight, that may limit one's ability to successfully manufacture a desired polymer.

Mineral tailings and oil sands tailings have a range of density and clay content, that can vary over time, and/or by location or other conditions. This variability may present challenges to obtain consistent chemical treatment results. An "optimal" chemical treatment may be formulated, to handle tailings having a specific subset of these properties. Small changes in the properties of the tailings substrate can change (e.g. reduce) the effectiveness of the chemical treatment. One way of overcoming this is to dilute the tailings stream to maintain specific clay to water ratios. Another option is to have multiple flocculants available for different tailings compositions. Neither of these options is ideal.

SUMMARY OF THE INVENTION

It is an aim of the present invention to reduce or even eliminate the above-mentioned problems appearing in prior art.

The aim of the invention is to provide a method and a treatment system for treating mineral or oil sands tailings substrate, which improve flocculation and dewatering of the tailings. Especially, the aim is to provide an improved method for treating of mature fine tailings (MFT), which may consist almost entirely of solids <45 microns.

It is especially an aim of the present invention to provide a method for treating mineral or oil sands tailings substrate, which improves the performance of a high molecular weight polyacrylamide flocculants and allows easy modification of the polyacrylamides to be suitable for the application and to the tailings to be treated.

Further, an aim of the present invention is to provide desired low molecular weight (MW) polyacrylamides to meet specific needs of the tailings substrate dewatering.

In order to achieve among others the objects presented above, the invention is characterized by what is presented in the enclosed independent claims. Some preferred embodiments of the invention will be described in the other claims.

The embodiments and advantages mentioned in this text relate, where applicable, both to the method as well as to the uses according to the invention, even though it is not always specifically mentioned.

A typical method according to the invention for treating tailings substrate from mining or oil sands separation process, the mineral or oil sands tailings substrate comprising an aqueous phase with suspended solid particulate material, the method comprising
  adding a flocculating agent to the tailings substrate, which flocculating agent comprises a degraded polyacrylamide comprising at least anionic units and having a process water viscosity reduced by 25-99%, preferably 50-99% compared to a substantially similar polyacrylamide that has not degraded by a degradation agent, measured at a shear rate $1\ s^{-1}$ as a 0.4-0.8 weight-% solution of polymer in process water,
  allowing flocs, which comprise solid particulate material, to form, and
  allowing the formed flocs to separate from the aqueous phase.

The present invention relates also a treatment system for treating mineral or oil sand tailings, which treatment system comprises
  polyacrylamide comprising at least anionic units and having a standard viscosity SV of more than 2.3 cP, preferably in the range of 2.3-8.0 cP, measured at 0.1 weight-% polymer concentration in 1 M NaCl, at 25° C. and pH 8.0-8.5, using Brookfield DVII T viscometer, and
  a degradation agent capable of reducing the viscosity of the polyacrylamide in an aqueous environment by cleaving the backbone of the polyacrylamide, resulting in a process water viscosity reduced by 25-99%.

It has been found that lower molecular weight polyacrylamides provide good dewatering characteristics when used for flocculation of mineral or oil sands tailings. The present invention is based on the use of the degraded polyacrylamide in treatment of mineral or oil sands tailings. It has been observed that it is possible to modify the molecular weight (MW) of the polyacrylamide by using a degradation agent, whereby the desired lower molecular weight polyacrylamide can be produced easily and cost-effectively. One approach of the present invention is to condition an aqueous solution of the polyacrylamide in a way that reduces its molecular weight to the desired level. Using the inventive methods described herein, it is possible to provide a polyacrylamide having a specified lower molecular weight on-site at a mineral or oil sands tailings processing facility, without requiring adjustment to the handling and grinding steps after polymer synthesis. The degradation of the polyacrylamide may be performed in-situ by dissolving dry polyacrylamide in an aqueous solution and incorporating a degradation agent in said aqueous solution, the obtained degraded polyacrylamide solution may be administered to the tailings substrate. Therefore, the present invention provides a method to improve the performance of a high molecular weight polyacrylamide by combining it with a degradation agent. The invention is to use a polymer degrading agent which yields a significant reduction in the viscosity or the molecular weight of the polyacrylamide to a range suitable for a particular mineral or oil sands tailings application. Experimental results show that the viscosity of polymer solution decreased with the addition of the degradation agent and reducing the molecular weight in this manner led to improved performance in dewatering of mineral or oil sands tailings.

Especially, it has been observed that the flocculation and dewatering of oil sands mature fine tailings may be significantly improved by conditioning the polymer flocculant, i.e. subjecting it to a degradation to achieve a specified degraded polyacrylamide. It has been found that above a threshold level of conditioning, recovered water maintains acceptable solids contents of <1 weight-%, although dewatering may be negatively impacted.

The present invention utilizes the addition of a degradation agent to reduce the molecular weight of the polymer to a desired level depending on the composition of the tailings, the chemistry of the process water used for polymer dissolution, and the dewatering method being applied. With the present invention, the components of the treatment system can easily be applied in the treatment processes of mineral or oil sands tailings without having to directly manufacture low molecular weight polyacrylamides. In the method and the treatment system according to the present invention, the dry polymers to be degraded are typically copolymers comprising acrylamide and at least anionic units with average standard viscosity (SV) of about 2.3 to 8.0 cP. The degradation of these dry polymers would be made with degradation agent, such as an iron compound, to reach a desired molecular weight depending on the results of screening tests for each tailings application.

DESCRIPTION OF THE DRAWINGS

The invention will be described in more detail with reference to appended drawings, in which.

DETAILED DESCRIPTION OF THE INVENTION

Figure 1:
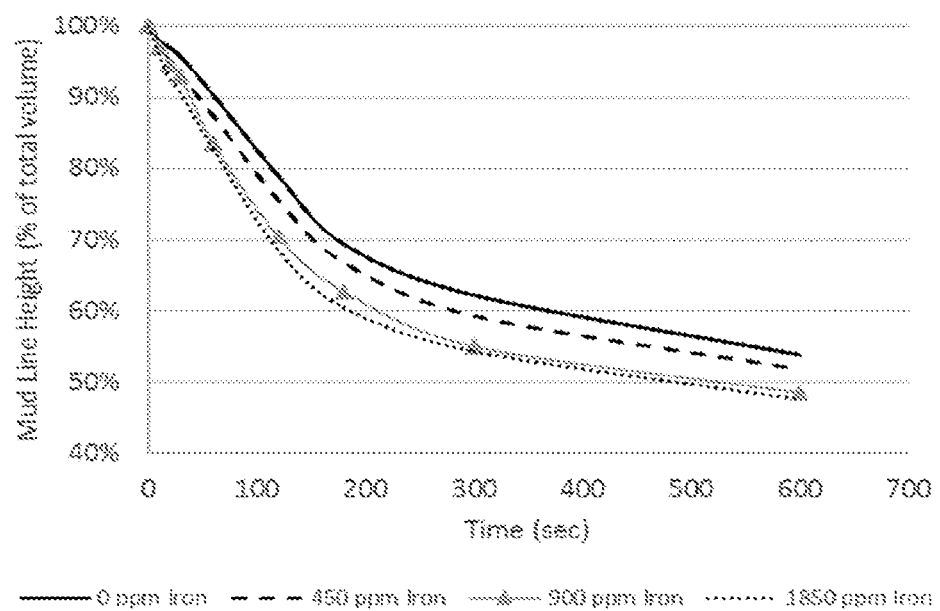
FIG. 1 represents the settling of the flocculated bed over time by using a polymer solution to which different amounts of iron degradation agent has been added, according to Example 1.

In the method according to the present invention, a flocculating agent is added to the mineral or oil sands tailings substrate for allowing flocs, which comprise solid particulate material, to form. The flocculating agent comprises a degraded polyacrylamide comprising at least anionic units and having a process water viscosity reduced by 25-99%, preferably 50-99%, compared to a substantially similar polyacrylamide that has not been degraded by a degradation agent, measured at a shear rate 1 s$^{-1}$ as a 0.4-0.8 weight-% solution of polymer in process water, using a viscometer. According to an embodiment of the present invention a degraded polyacrylamide is obtainable by dissolving a polyacrylamide in an aqueous medium and incorporating in said aqueous medium a degradation agent. A polyacrylamide to be degraded may be any high molecular weight polyacrylamide comprising at least anionic units, for example an anionic dry polyacrylamide obtained by gel polymerization. The polyacrylamide to be degraded may have a standard viscosity (SV) of more than 2.3 cP, or preferably more than 3.0 cP, measured at 0.1 weight-% polymer concentration in 1 M NaCl, at 25° C. and pH 8.0-8.5, using Brookfield DVII T viscometer. According to an embodiment of the invention, the polyacrylamide to be degraded may have a standard viscosity in the range of 2.3-8.0 cP and preferably in the range of 3.0-6.0 cP, measured at 0.1 weight-% polymer concentration in 1 M NaCl, at 25° C. and pH 8.0-8.5, using Brookfield DVII T viscometer.

According to an embodiment of the invention, a polyacrylamide to be degraded may be an anionic polyacrylamide (APAM). The anionic polyacrylamide may be a linear, branched or cross-linked copolymer of (meth)acrylamide and at least one anionic monomer, such as unsaturated carboxylic acid monomer. Preferably the anionic monomer is selected from unsaturated mono- or dicarboxylic acids, such as acrylic acid, methacrylic acid, maleic acid, itaconic acid, crotonic acid, isocrotonic acid, fumaric acid and any combination thereof. While referring to the acid form, it is meant to also cover other forms, such as salt forms of said unsaturated mono- or dicarboxylic acids. Other anionic monomers include monomers comprising sulphonic acid groups, such as vinylsulphonic acid, allyl sulphonic acid, 2-acrylamide-2-methylpropanesulfonic acid, 2-methacrylamido-2-methylpropanesulphonic acid, 2-acrylamido-butanepropanesulphonic acid, 3-acrylamide-3-methylbutanesulphonic acid, 2-acrylamido-2,4,4-trimethylpropanesulphonic acid, styrene sulfonic acid, or monomers containing phosphonic acid groups, such as vinyl phosphonic acid, allyl phosphonic acid, methacrylate phosphate, N-(meth)acrylamidoalkylphosphonic acids, (meth)acryloyloxyalkylphosphonic acids, or ethylene glycol may be included. According to one preferable embodiment the anionic polyacrylamide is a copolymer of acrylamide and unsaturated carboxylic acid monomers, such as (meth)acrylic acid, maleic acid, crotonic acid, itaconic acid or any combination thereof. Preferably the anionic polyacrylamide is a copolymer of acrylamide and acrylic acid, or a copolymer of acrylamide and itaconic acid, or a copolymer of acrylamide and methacrylic acid. The anionic polyacrylamide may also be a partially hydrolysed poly(meth)acrylamide, obtainable by polymerizing (meth)acrylamide monomers to obtain a poly(meth)acrylamide followed by a partial acid or alkali hydrolysis of the poly(meth)acrylamide to obtain the anionic polyacrylamide.

In an embodiment of the invention, the anionic polyacrylamide may comprise one or more additional non-ionic units. Exemplary non-ionic units may be derived from monomers that possess a neutral charge. Exemplary non-ionic monomers may be selected from acrylamide, methacrylamide, vinyl, allyl, ethyl, and the like. Some exemplary non-ionic monomers may be substituted with a side chain selected from, for example, an alkyl, arylalkyl, dialkyl, ethoxyl, and/or hydrophobic group.

In an embodiment of the invention, a polyacrylamide to be degraded may be amphoteric polyacrylamide comprising both anionic and cationic units, and optionally non-ionic units in an aqueous solution at pH 7. Amphoteric polyacrylamide is obtained by copolymerisation of acrylamide or (meth)acrylamide together with both anionic and cationic monomers. According to the invention the amphoteric polyacrylamide has an anionic net charge at pH 7. This means that the net charge of the amphoteric polyacrylamide remains negative, even if it contains cationic units. The net charge of the amphoteric polyacrylamide is calculated as the sum of the charges of the cationic and anionic units present.

The cationic groups in the amphoteric polyacrylamide may originate from monomers selected from 2-(di methylamino) ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC).

In an embodiment according to the invention the polyacrylamide comprises at least 10 mol-% structural units originating from anionic monomers, preferably the amount of anionic monomers is in the range of 20-45 mol-%. In a preferred embodiment, the polyacrylamide to be degraded has an anionic net charge.

According to an embodiment of the invention polyacrylamide to be degraded may comprise anionic monomers and (meth)acrylamide in a mole ratio of 10:90 to 100:0, or preferably 20:80 to 45:55 for providing the desired flocculation effect, especially in MFT flocculation.

Polyacrylamide may comprise, in addition to the (meth) acrylamide and anionic monomers, small amounts of other polymerisation additives, such as cross-linker monomers. An example of a suitable cross-linker monomer is methylene bisacrylamide. The amount of these polymerisation additives is, however, small, such as <1000 ppm, typically <600 ppm, more typically <100 ppm, sometimes even <10 ppm.

The polyacrylamide to be degraded may be obtained by solution polymerization, emulsion polymerization, dispersion polymerization, or gel polymerization. In other words, the polyacrylamide may be in the form of a solution polymer, an emulsion polymer, a dispersion polymer, or a dry powder.

According to an embodiment of the invention, a polyacrylamide having optimal molecular weight may be obtained by degradation of a polyacrylamide. In one embodiment, the degraded polyacrylamide may be obtained by combining a degradation agent with an aqueous solution comprising a high molecular weight (HMW) polyacrylamide, thereby cleaving the backbone of the HMW polyacrylamide to provide a degraded polyacrylamide. The resultant degraded polyacrylamide may have a decreased solution viscosity, and molecular weight, compared to the original HMW polyacrylamide that has not been degraded. By using this method of degradation, the molecular weight of the original HMW polyacrylamide may be decreased in a controlled way in the aqueous solution. According to an embodiment of the invention, a degraded polyacrylamide may comprise at least anionic units and have a standard viscosity (SV) in the range of 1.0-3.0 cP and preferably 1.20-2.60 cP, measured at 0.1 weight-% polymer concentration in 1 M NaCl, at 25 CC and pH 8.0-8.5, using Brookfield DVII T viscometer.

A degraded polyacrylamide according to the present invention, when combined with process water, produces a solution having a process water viscosity that is reduced by 20-99%, preferably 50-99%, compared to a substantially similar solution comprising the same polyacrylamide that has not been degraded by a degradation agent. Process water viscosity is measured at a shear rate 1 s$^{-1}$ as a 0.4-0.8 weight-% solution of polymer in process water, using a viscometer. According to an embodiment of the invention, a flocculating agent may comprise a degraded polyacrylamide according to the embodiments, comprising at least anionic units and having standard viscosity (SV) in the range of 1.0-3.0 cP and preferably 1.20-2.60 cP, measured at 0.1 weight-% polymer concentration in 1 M NaCl, at 25 CC and pH 8.0-8.5, using Brookfield DVII T viscometer. The degraded polyacrylamide is obtained by degradation of dry polyacrylamide comprising at least anionic units. A suitable level of degradation is dependent on the intended tailings application, including the characteristics of the substrate and the desired results.

The degradation agent may be any compound or mixture of compounds capable of breaking, i.e., cleaving, the backbone of the polyacrylamide into smaller polymeric fragments in an aqueous environment. The effect of the degradation agent and the cleavage of the polymer backbone can be seen in the decreasing viscosity of the aqueous medium comprising the polyacrylamide. The degradation agent may be selected from compounds or mixtures of compounds capable of reducing the solution viscosity of the polyacrylamide by at least 20%, preferably by at least 30%, more preferably by at least 40%, and even more preferably by at least 50%. As a comparison, a mere hydrolysis of functional groups from side chains of e.g. a (meth)acrylamide-based copolymer does not cause sufficient reduction of viscosity.

In an embodiment according to the present invention, a degradation agent is selected from the group consisting of an iron-containing compound, persulphate, peroxide, sodium chlorite, tin (II) chloride and percarbonate. According to a preferred embodiment of the invention, the degradation agent comprises iron compound or iron compound in combination with citric acid or its salts. Preferably, the degradation agent comprises an iron compound. This compound is advantageously a ferrous compound such as a ferrous salt or a ferric compound such as a ferric salt, these being available in dry powder form. Alternatively, the degradation agent may be in the form of a solution. Iron compounds are generally environmentally friendly compounds. The term ferrous is used according to its customary meaning to indicate a divalent iron compound (+2 oxidation state or Fe(II)). The term ferric is used according to its customary meaning to indicate a trivalent iron compound (+3 oxidation state or Fe(III)).

In an advantageous embodiment, the ferrous salt is ferrous citrate, ferrous chloride, ferrous bromide, ferrous fluoride, ferrous sulfate, ammonium iron sulfate or combinations thereof. The most advantageous polymer degradation agent for use in the present disclosure is iron(II)sulfate. Iron sulfate, in particular ferrous sulfate, is able to dissolve and degrade at ambient conditions whereas the other degradation agents require elevated temperature to achieve the same polymer degradation effectiveness.

It was found that the level of an iron compound in the degradation agent may be reduced by using it in combination with citric acid or its salts. When the amount of the iron compound required is reduced, it helps to prevent excess iron in the water. In an embodiment according to the invention, the degradation agent is a combination of an iron compound and citric acid or its salts. In an embodiment, an iron compound is used in combination with sodium citrate. Sodium citrate may refer to any of the sodium salts of citrate, such as monosodium citrate, disodium citrate or trisodium citrate. In one preferred embodiment, the anionic polyacrylamide is degraded by using a combination of ferrous sulfate and sodium citrate.

The aqueous solution of the degraded polyacrylamide is typically obtainable by dissolving dry polyacrylamide comprising at least anionic units and dry degradation agent in an aqueous medium sequentially or as a mixture. The dry polyacrylamide easily degrades and dissolves into an aqueous medium, such as water, at ambient temperature in the presence of a suitable amount of degradation agent, producing a solution comprising the degraded polyacrylamide. The polymer concentration of the aqueous solution may be 0.1-10 weight-%, preferably 0.2-5 weight-%, more preferably 0.3-2 weight-%. A suitable concentration of the aqueous solution may determine based on the intended tailings application and desired results. The obtained degraded polyacrylamide is chemically degraded. Conventional dissolution equipment may be used for preparing the degraded polyacrylamide.

By using the method of degradation according to the embodiments, the degradation of polyacrylamide in an aqueous solution can be easily controlled to make any necessary or desired molecular weight ranges by adjusting the amount of degradation agent at ambient temperatures. According to an embodiment of the invention, the total amount of the degradation agent may be from 0.5-10 weight-%, preferably 1-8 weight-%, and more preferably 1-6 weight-% of the polyacrylamide, calculated on a dry weight basis. According to an embodiment of the invention, the degradation agent may comprise both an iron compound and citric acid or its salts, wherein the amount of the iron compound may in the range of 1-2 weight-% and the amount of citric acid or its salts may be in the range of 2-4 weight-% of the polyacrylamide, calculated on a dry weight basis. A suitable level of degradation agent may be determined on the basis of the intended tailings application, including the characteristics of the tailings substrate and the desired results.

According to a preferred embodiment of the invention the degradation agent is incorporated in the polyacrylamide solution prior to an addition of the flocculating agent to the tailings substrate, i.e., degradation of polyacrylamide is carried out and then the obtained degraded polyacrylamide is added to the tailings substrate. According to an embodiment of the invention, it may also be possible that at least part of the polyacrylamide and the degradation agent are added directly into the tailings substrate, wherein the degradation may be taken place in the tailing substrate.

During treatment of tailings, the flocculating agent is added to the tailings substrate and flocs, which comprise solid particulate material, are allowed to form. According to the embodiments, the formed flocs may be separated from the aqueous phase of the tailings stream. Separating the flocculated solids from the tailings stream may be accomplished by any means known to those skilled in the art. Exemplary separation methods include but are not limited to centrifuges, hydrocyclones, decantation, filtration, thickeners, or another mechanical separation method. Exemplary separation methods may include in-line conditioning (e.g., pipeline shearing with static or dynamic mixers) and/or transport of the flocculated material. Exemplary separation methods may include deposition of the flocculated materials onto a sub-aerial deposition area, allowing water to separate from a solids-enriched material, for example, by draining, evaporation, freeze-thaw, and/or permeation mechanisms. Exemplary separation methods may include deposition of the flocculated materials to a sub-aqueous deposition area, allowing the solids to consolidate to form a solids-rich lower stratum below an aqueous layer. Exemplary separation methods may include a combination of one or more of these and other separation methods.

According to an embodiment a dewatered floc phase is obtained, which floc phase may have a solids content of at least 40 weight-%, preferably at least 45 weight-%, more preferably at least 50 weight-%. The solids content of the floc phase can be determined on the basis of the intended tailings application, and desired results. It has also been found that recovered water maintains acceptable solids contents of <1 weight-%. After separation of the flocs, the separated aqueous phase may be recycled, reused, and/or released to the surroundings. The invention may provide a substantially clean aqueous phase (i.e. relatively low solids) that can be used in the original extraction process from where the tailings originate, or it may be used in some other associated process. Alternatively, the aqueous phase may be returned to the surroundings. Optionally, the aqueous phase may be subject to optional further water treatment steps. In embodiments, the processes may additionally comprise one or more processes or additives to remove contaminants from the aqueous phase, such as, for example, bitumen, naphthenic acid, arsenic, and/or selenium.

Tailings, which are treated with the present invention, may originate from mining or oil sands separation process. Tailings may originate from a separation process involving oil sand, oil shale, oil contaminated sand or oil contaminated earth or sand containing crude oil. The tailings stream may comprise water, solids and residual bitumen. The tailings may have a dry solids content of 10-45%, which primarily comprises solids <44 microns. Oil sands process tailings contain mineral solids having a variety of particle sizes. Mineral fractions with a particle diameter greater than 45 microns are referred to as "coarse" particles or "sand." Mineral fractions with particle diameter less than 45 microns are referred to as "fines" and are essentially comprised of silica and silicates and clays that can be easily suspended in the water. Ultrafine solids (<2 µm) may also be present in the tailings stream and are primarily composed of clays. The tailings may include one or more of coarse particles, fine tailings, or ultrafine solids.

Fine tailings are generated after the process tailings are sent to a settling pond. Eventually, the coarse tailings settle to the bottom of the pond, leaving a weak gel of fine tailings (average diameter <45 µm) suspended in the water. Fine tailings tend to be almost entirely composed of clays. While fine tailings primarily consist of particles that are smaller than 45 µm in diameter, the majority of the solids in the process tailings have diameters between 44 and 1000 µm and above. In exemplary embodiments, the tailings can be one or more of any of the tailings streams produced in a process to extract bitumen from an oil sands ore, for example one or more of the coarse tailings, fine tailings, and froth treatment tailings. In exemplary embodiments, the tailings may comprise paraffinic or naphthenic froth treatment tailings, for example paraffinic froth tailings. The tailings may be combined into a single tailings stream for dewatering or each tailings stream may be dewatered individually. Depending on the composition of the tailings stream, the viscosity of degraded polyacrylamide in the flocculating agent may change. Such change may be determined from experience with different tailings streams compositions.

In an embodiment according to the invention, the method can be used to treat ultrafine solids. In exemplary embodiments, the tailings stream comprises a fine (particle size <45 µm) content of about 10 to about 100 weight-%, about 20 to about 100 weight-%, about 30 to about 100 weight-%, or about 50 to about 100 weight-% of the dry tailings.

Tailings may also comprise residual bitumen. In the present context the term "bitumen" is understood as a highly viscous mixture of crude oil, comprising hydrocarbons heavier than pentanes, and which mixture has a viscosity above 10 000 cP, and is non-mobile at reservoir conditions. Bitumen may have an API gravity <12°, preferably <10°, more preferably <8°. The API gravity of bitumen may be in the range of 12°-6°. Bitumen may comprise >15 weight-%, preferably >25 weight-%, of asphaltenes. The total amount of asphaltenes and resins in bitumen may be >40 weight-%, preferably >45 weight-%. Tailings may comprise 0-5 weight-%, of bitumen, before addition of the flocculating agent.

According to an embodiment of the invention, the flocculating agent may be added to tailings in an amount of 0.1-3 kg/ton of dry tailings. A suitable amount of the flocculating agent is dependent on the intended tailings application, including the characteristics of the substrate and the desired results.

A better understanding of the present invention may be obtained through the following examples which are set forth to illustrate but are not to be construed as the limit of the present invention.

EXPERIMENTAL

Preparation of the Polymer Solution 1. 0.4% or 0.8% polymer solution (as specified) was made by dissolving a dry anionic polyacrylamide of SV between 3.0-5.0 cP in oil sands process water. This solution was aged while mixing for at least 3 hours.

2. For solutions to which dry iron degradation agent was added, the specified iron degradation and (optionally) citrate agent were first placed in a separate vial. Polymer solution was then added to the vial and allowed to mix with the degradation agent for 1 hour on a laboratory rotary mixer. If a liquid solution of iron degradation agent was used instead, the polymer solution before degradation was first added to a separate beaker with a magnetic stirrer. While stirring, the iron degradation solution was added and allowed to mix for 1 hour.

3. The viscosity of the polymer solutions was then measured using an Anton Paar rheometer equipped with a single-gap concentric cylinder in order to obtain a curve of viscosity vs. shear rate.

4. For some solutions, the viscosity was measured again after 24 hours to determine if degradation continued or stopped after the initial 1-hour mix time.

Example 1: Dilute Tailings Settling Experiment

In the following Example, the effect of adding polymer solutions containing different levels of iron degradation agents was observed. Tailings substrates were prepared by adding approximately 160-180 g samples of tailings having 12% solids to 250 mL beakers. Each of the beakers was stirred with a 4-blade pitched impeller for 1 min at 400 rpm prior to polymer addition. Polymer solutions (0.4% polymer) containing 0 ppm, 450 ppm, 900 ppm, and 1850 ppm iron (ferrous chloride in liquid form, amount is µL of liquid ferrous chloride per kg of dry polymer), were added to the tailings substrate as a single injection. The dosage of polymer solutions was to provide approximately 190-200 g of polymer/ton of dry solid tailings. Each mixture was stirred for an additional 30 seconds at 400 rpm to condition the flocs and then the impeller was stopped. The treated tailings were transferred to a 250 mL graduated cylinder and the volume height of the settling floc bed was recorded over time. After 10 minutes of settling, the final bed height was recorded, and the entire supernatant was sampled into a separate container. The supernatant was stirred to homogenize and then a 20 g sample was taken and measured for solids content by drying in an oven overnight at 110° C. The settling of the flocculated bed vs. time is shown in the FIG. 1. The solids content of the supernatant is shown in the Table 1.

TABLE 1

| Amount of Iron (ppm on polymer) | Supernatant Solids content (weight-%) |
|---|---|
| 0 ppm Iron | 1.27 |
| 450 ppm Iron | 1.14 |
| 900 ppm Iron | 0.97 |
| 1850 ppm Iron | N/A |

Adding the iron to the polymer solution reduced the mud line height and the solids content in the supernatant. When adding 900 ppm of the iron, the solids content in the supernatant was reduced by 24%. This indicates the benefit of modifying the polyacrylamide solution prior to applying it to the oil sands tailings.

Example 2: Dilute Tailings—Degradation Agent Addition Point Experiment

In this Example, the effect of adding the iron degradation agent to the polymer solution versus the tailings substrate was observed. Tailings substrates and polymer solutions (0.4%) were prepared as described above. An iron degradation agent (ferrous chloride in liquid form, amount is µL of liquid ferrous chloride per kg of dry polymer) was added to the polymer solution, to the tailings substrate, or not at all, as described below. The polymer solution was added to the tailings substrate as described above in Example 1, and the settling of the flocculation bed and solids content of the supernatant were measured over time. In Comparative Test 1, the tailings treatment was the polymer solution without iron. In Test 2, the iron degradation agent was added to the polymer solution to provide 4000 ppm of iron (per polymer), and the molecular weight of the polymer was reduced before adding the polymer solution to the tailings substrate. In Test 3, the same amount of iron degradation agent as in Test 2 was added directly to the tailings substrate and mixed for 1 minute before the injection of polymer solution (which did not contain iron degradation agent). The settling of the flocculated bed vs. time is shown in the FIG. 2. The solids content of the supernatant is shown in the Table 2.

TABLE 2

| Test | Conditions | Supernatant Solids content (weight-%) |
|---|---|---|
| 1 | 0 ppm of Iron added | 1.24 |
| 2 | 4000 ppm of Iron added to polymer solution | 0.82 |
| 3 | 4000 ppm of Iron added to tailings | 1.17 |

Figure 2:
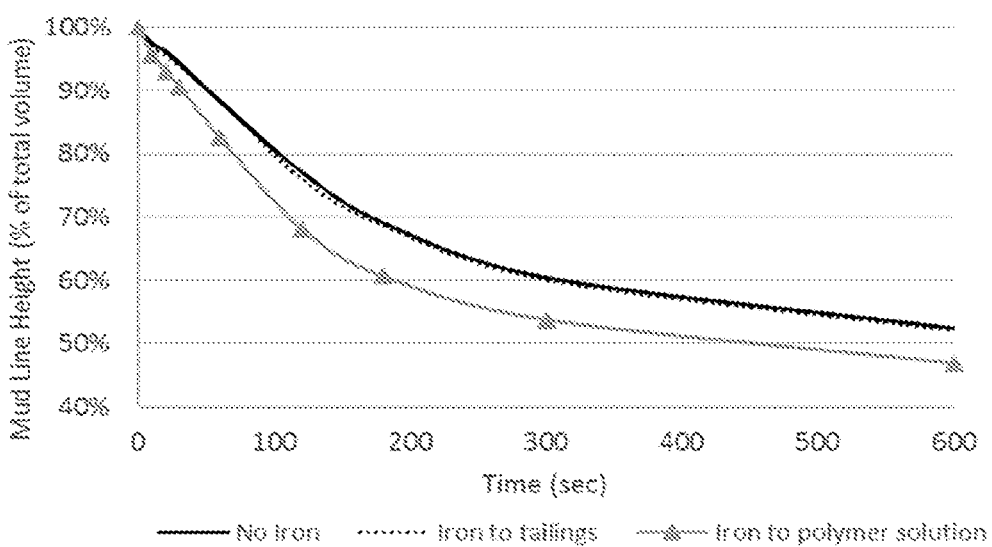
FIG. 2 represents the settling of the flocculated bed over time by using polymer solutions and iron degradation agents added to the polymer solution or to the tailings substrate, according to Example 2.

The results shown in the Table 2 and FIG. 2 show that the modification of the molecular weight of the polymer in solution prior to injection provided the best results.

Example 3: Concentrated Tailings Sieve Dewatering Experiment

Figure 3:
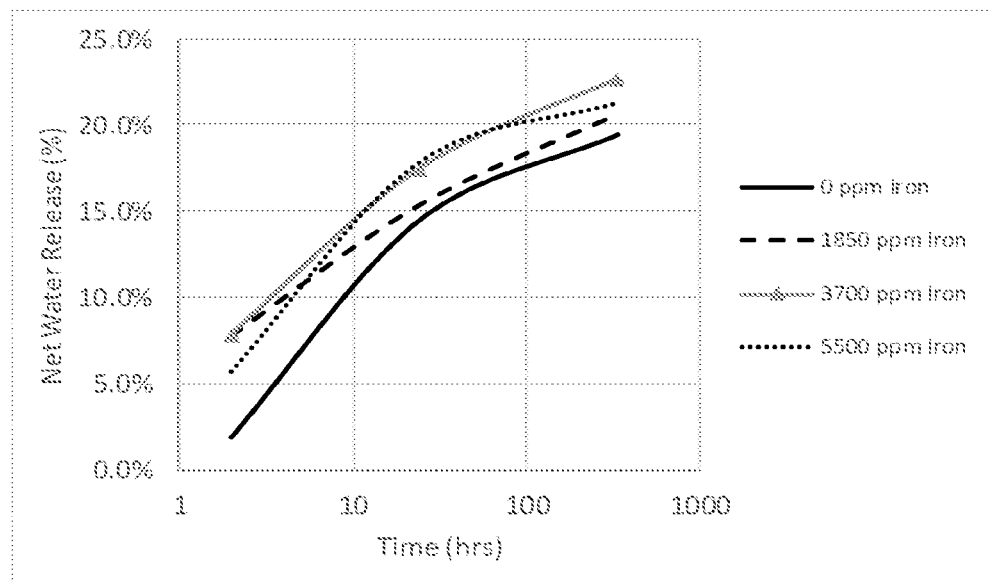
FIG. 3 shows the net water release determined over time for a tailings substrate treated with a polymer solution to different amounts of iron as a degradation agent have been added, according to Example 3.

In the following experiments, 375 g of mature fine tailings samples from Fort McMurray, Canada were added to 1000 mL beakers. Each of the beakers was stirred with a flat-blade impeller for 3 minutes at 400 rpm prior to polymer addition. Polymer solutions (0.4%), containing the respective amounts of iron (ferrous chloride added in liquid form) as described in Table 3, were added to the tailings and mixed for 7 seconds. The dosage of polymer solutions was to provide approximately 880-900 g of polymer/ton of dry solid tailings. Each mixture was stirred for an additional 45 seconds at 20 rpm to condition the flocs and then the impeller was stopped. The treated tailings were transferred to a sieve with 1 mm aperture and allowed to dewater over time. The net water release was determined over time, as shown in the FIG. 3.

Stability of the polymer solutions was also studied. The results in Table 3 demonstrate that the solutions of the degraded polyacrylamide were stable after 24 hours of reaction time. The viscosity value recorded after one hour was substantially the same as the viscosity measurement taken the next day, indicating that the degradation stopped and would not continue over time. This indicates that the reaction occurred very quickly, and that the reactivity of the iron was reduced or depleted after the viscosity drops.

The results shown in Table 3 also demonstrate that molecular weight of an anionic dry polymer in process water solution can be degraded at ambient temperature in the presence of iron compound. The original process water viscosity of a 0.4% active solution was 213 cP at 1 $s^{-1}$, compared to viscosities of 134, 95, and 54 cP after the addition of 1848, 3696, and 5544 ppm ferrous ion, respectively.

TABLE 3

| Amount of Iron (ppm on polymer) | 1-hour viscosity (cP) | 24 hours viscosity (cP) |
| --- | --- | --- |
| 0 | 213 | N/A |
| 1848 | 134 | 143 |
| 3696 | 95 | 102 |
| 5544 | 54 | 56 |
| 7392 | 45 | N/A |

Example 4: Concentrated Tailings Centrifuge Dewatering Experiment

Figure 4:
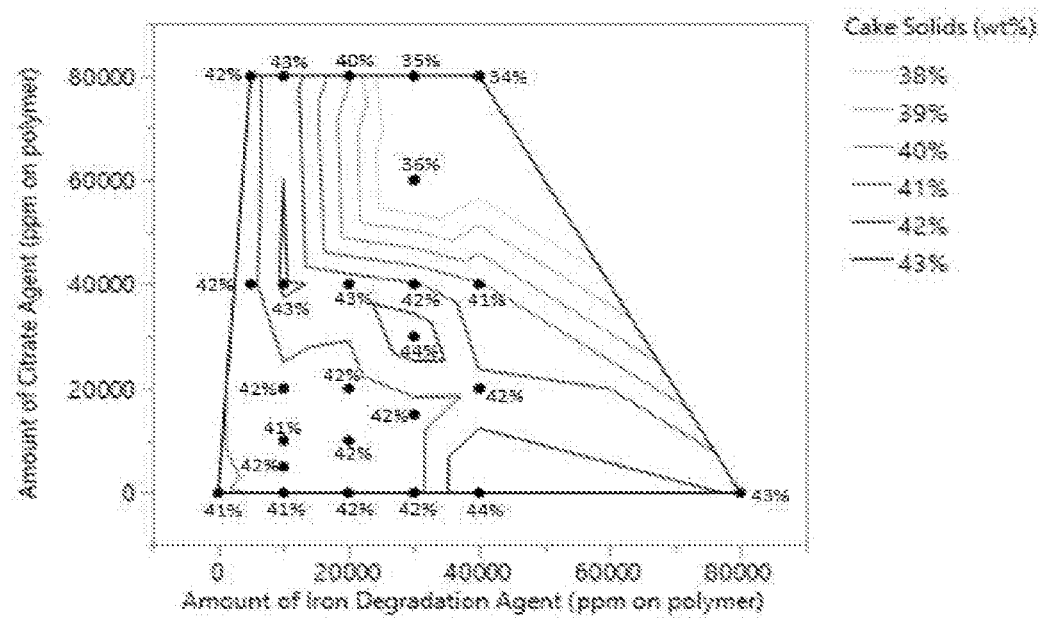
FIG. 4 shows the solids content for cakes resulting from tailings treatment using polymer solutions having different amounts of degradation agents comprising iron and citrate, according to Example 4.

In the following experiments, 500 g of mature fine tailings samples from Fort McMurray, Canada were added to 1000 mL beakers. Each of the beakers was stirred with a 4-blade pitched impeller for 1 minute at 300 rpm prior to polymer addition. Polymer solutions (0.8%) containing various amounts of iron degradation (ferrous sulfate heptahydrate in dry form) and citrate agent (sodium citrate tribasic dihydrate, amounts specified in FIGS. 4 and 5) were added to the tailings as a single injection. The dosage of polymer solutions was to provide approximately 940-960 g of polymer/ton of dry solid tailings. Each mixture was stirred for an additional 131 seconds at 300 rpm to condition the flocs and then the impeller was stopped. The treated tailings were transferred to a 50 mL centrifuge tube and centrifuged for 2 minutes at 910 relative centrifugal force. The solids content of the resulting centrate and centrifuge cake were determined, as shown in FIGS. 4 and 5.

Figure 5:
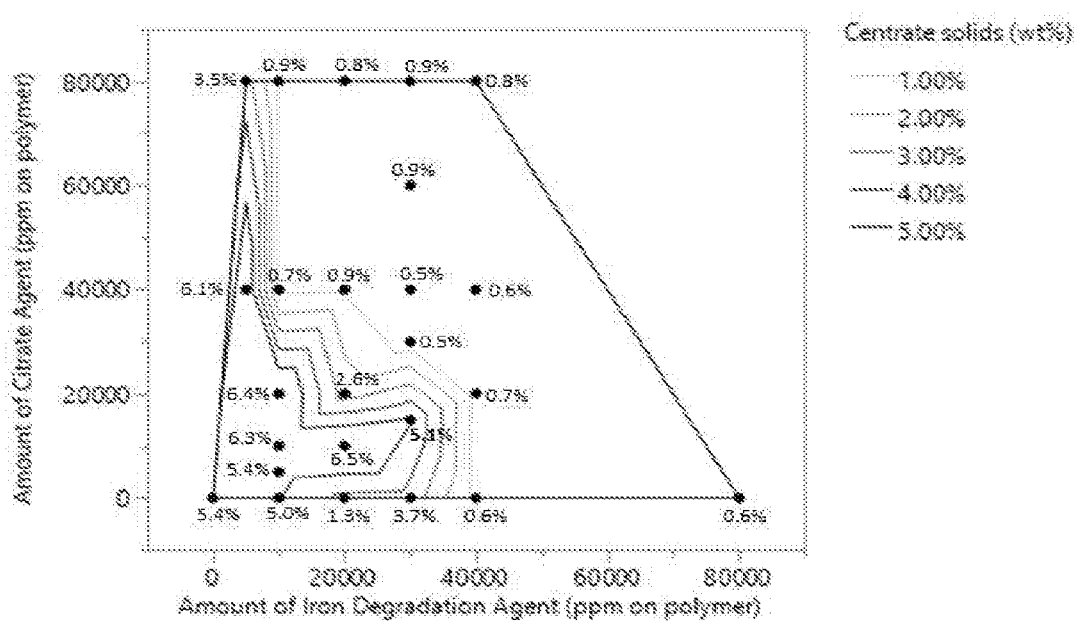
FIG. 5 shows the solids content for centrate resulting from tailings treatment using polymer solutions having different amounts of degradation agents comprising iron and citrate, according to Example 4.

As shown in FIG. 5, centrate solids were reduced to the desired level of <1.0 weight-% solids with increasing concentration of degradation agent. The combination of iron degradation and citrate agent made it possible to achieve reduced centrate solids at lower concentrations of iron degradation agent. As shown in FIG. 4, an increase in cake solids was obtained at an optimum concentration of iron degradation and citrate agent. It was found that concentrations above the optimum range resulted in excess MW reduction and a decrease in cake solids.

The invention claimed is:

1. A method for treating tailings substrate from mining or oil sands separation process, the tailings substrate comprising an aqueous phase with suspended solid particulate material, the method comprising:
   (i) adding a flocculating agent to the tailings substrate, which flocculating agent comprises a degraded amphoteric polyacrylamide comprising both anionic and cationic units having a process water viscosity reduced by 25-99% compared to a substantially similar polyacrylamide that has not been degraded by a degradation agent, measured at a shear rate 1 $s^{-1}$ as a 0.4-0.8 weight-% solution of polymer in process water,
   (ii) allowing flocs, which comprise solid particulate material, to form, and
   (iii) allowing the formed flocs to separate from the aqueous phase.

2. The method according to claim 1, wherein the degraded amphoteric polyacrylamide is obtainable by dissolving dry amphoteric polyacrylamide having a standard viscosity (SV) of more than 2.3 cP measured at 0.1 weight-% polymer concentration in 1 M NaCl, at 25° C. and pH 8.0 to 8.5, using Brookfield DVII T viscometer, in an aqueous medium and incorporating in said aqueous medium the degradation agent.

3. The method according to claim 2, wherein the amphoteric polyacrylamide to be degraded comprises at least 10 mol-% structural units originating from one or more anionic monomers.

4. The method according to claim 2, wherein the polyacrylamide to be degraded has an anionic net charge.

5. The method according to claim 2, wherein the amphoteric polyacrylamide to be degraded comprises one or more anionic monomers and (meth)acrylamide in a mole ratio ranging from 10:90 to less than 100:0.

6. The method according to claim 2, wherein the degradation agent comprises an iron compound, an iron compound in combination with citric acid or its salts, persulphate, peroxide, sodium chlorite, tin (II) chloride, or percarbonate.

7. The method according to claim 2, wherein the degradation agent is present in an amount ranging from 0.5 to 10 weight-% of the amphoteric polyacrylamide, calculated as dry.

8. The method according to claim 1, wherein the flocculating agent is added to the tailings substrate in an amount ranging from 0.1-3 kg/ton of dry tailings.

9. The method according to claim 1, wherein the formed flocs are separated from the aqueous phase by settling, centrifugation, filtration or thin lift dewatering.

10. The method according to claim 1, wherein the degraded amphoteric polyacrylamide has a process water viscosity reduced by 50-99% compared to the substantially similar polyacrylamide that has not been degraded by the degradation agent, measured at a shear rate 1 $s^{-1}$ as a 0.4-0.8 weight-% solution of polymer in process water.

11. The method according to claim 2, wherein the dry amphoteric polyacrylamide has a standard viscosity (SV) ranging from 2.3-8.0 cP measured at 0.1 weight-% polymer concentration in 1 M NaCl, at 25° C. and pH 8.0-8.5, using Brookfield DVII T viscometer.

12. The method according to claim 3, wherein the one or more anionic monomers are present in an amount ranging from 20-45 mol-%.

13. The method according to claim 5, wherein the amphoteric polyacrylamide to be degraded comprises one or more anionic monomers and (meth)acrylamide in a mole ratio ranging from 20:80 to 45:55.

14. The method according to claim 7, wherein the degradation agent is present in an amount ranging from 1 to 8 weight-% of the amphoteric polyacrylamide, calculated as dry.

15. A treated tailings composition, which comprises:
   (a) mineral or oil sand tailings comprising at least an aqueous phase with suspended solid particulate material; and
   (b) a flocculating agent comprising a degraded amphoteric polyacrylamide comprising both anionic and cationic units having a process water viscosity reduced by 25-99% compared to a substantially similar polyacrylamide that has not been degraded by a degradation agent, measured at a shear rate 1 s$^{-1}$ as a 0.4-0.8 weight-% solution of polymer in process water;
   wherein said flocculating agent further comprises
      (i) water;
      (ii) an amphoteric polyacrylamide comprising both anionic and cationic units having a SV of more than 2.3 cP measured at 0.1 weight-% polymer concentration in 1 M NaCl, at 25° C. and pH 8.0-8.5, using Brookfield DVII T viscometer, and
      (iii) a degradation agent capable of reducing the standard viscosity of the amphoteric polyacrylamide in an aqueous environment by cleaving the backbone of the amphoteric polyacrylamide, wherein said degradation agent comprises an iron compound or an iron compound in combination with citric acid or its salts.

16. The treated tailings composition according to claim 15, wherein the degradation agent comprises an iron compound, an iron compound in combination with citric acid or its salts, persulphate, peroxide, sodium chlorite, tin (II) chloride and percarbonate.

17. The treated tailings composition according to claim 15, wherein the amphoteric polyacrylamide comprises at least 10 mol-% structural units originating from one or more anionic monomers.

18. The treated tailings composition according to claim 17, wherein the amphoteric polyacrylamide comprises one or more anionic monomers and (meth)acrylamide in a mole ratio of 10:90 to less than 100:0.

19. The treated tailings composition according to claim 15, wherein the amphoteric polyacrylamide has a SV ranging from 2.3-8.0 cP measured at 0.1 weight-% polymer concentration in 1 M NaCl, at 25° C. and pH 8.0-8.5, using Brookfield DVII T viscometer.

20. The treated tailings composition according to claim 17, wherein the one or more anionic monomers are present in an amount ranging from 20-45 mol-%.

21. The treated tailings composition according to claim 18, wherein the amphoteric polyacrylamide comprises one or more anionic monomers and (meth)acrylamide in a mole ratio ranging from 20:80 to 45:55.

22. The treated tailings composition according to claim 15, wherein the water comprises mineral or oil sands process water.

23. The method according to claim 1, wherein the degraded amphoteric polyacrylamide is obtainable by copolymerisation of acrylamide and/or (meth)acrylamide together with anionic monomers, cationic monomers, and optionally non-ionic monomers, wherein said cationic monomers may be selected from the group consisting of 2-(di methylamino) ethyl acrylate (ADAM), [2-(acryloyloxy) ethyl] trimethyl ammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethyl sulphate, [3-(acryloylamino)propyl]trimethylammonium chloride (APTAC), [3-(methacryloylamino)propyl]trimethylammonium chloride (MAPTAC), and diallyldimethylammonium chloride (DADMAC).

24. The treated tailings composition according to claim 15, wherein
   (i) the amphoteric polyacrylamide to be degraded has an anionic net charge,
   (ii) the degradation agent is present in an amount ranging from 0.5 to 10 weight-% or from 1 to 8 weight-% of the amphoteric polyacrylamide, calculated as dry, and
   (iii) the flocculating agent is present in an amount ranging from 0.1-3 kg/ton of dry tailings.

25. The treated tailings composition according to claim 15, wherein the amphoteric polyacrylamide comprises acrylamide and/or (meth)acrylamide together with anionic monomers, cationic monomers, and optionally non-ionic monomers, wherein said cationic monomers may be selected from the group consisting of 2-(di methylamino) ethyl acrylate (ADAM), [2-(acryloyloxy) ethyl] trimethyl ammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethyl sulphate, [3-(acryloylamino)propyl]trimethylammonium chloride (APTAC), [3-(methacryloylamino)propyl]trimethylammonium chloride (MAPTAC), and diallyldimethylammonium chloride (DADMAC).

* * * * *